United States Patent [19]
Günther et al.

[11] Patent Number: 5,127,929
[45] Date of Patent: Jul. 7, 1992

[54] PROCESS FOR THE MANUFACTURING OF OPTICAL WAVEGUIDES WITH FUSION OF A SLEEVING TUBE ONTO A MOTHER PREFORM

[75] Inventors: Robert Günther, Elzach; Ulrich Siemers, Rinningen; Manfred Wittmann, Stuttgart, all of Fed. Rep. of Germany

[73] Assignee: Alcatel N.V., Netherlands

[21] Appl. No.: 758,636

[22] Filed: Sep. 12, 1991

Related U.S. Application Data

[63] Continuation-in-part of Ser. No. 546,240, Jun. 28, 1990, abandoned.

[30] Foreign Application Priority Data

Jun. 28, 1989 [DE] Fed. Rep. of Germany ........ 3921086

[51] Int. Cl.$^5$ ............................................. C03B 23/08
[52] U.S. Cl. ................................. 65/3.15; 65/DIG. 16; 65/3.11; 65/271; 65/29; 264/1.2
[58] Field of Search ................... 65/3.11, 3.12, 3.15, 65/11.1, 12, 271, 292, DIG. 16, 29; 264/1.2, 1.7

[56] References Cited

U.S. PATENT DOCUMENTS

| | | | |
|---|---|---|---|
| 4,263,030 | 4/1981 | Kobayashi et al. | 65/DIG. 16 |
| 4,278,459 | 7/1981 | Partus | 65/3.12 |
| 4,813,989 | 3/1989 | Uchiyama et al. | 65/3.12 |

FOREIGN PATENT DOCUMENTS 2038311 7/1980 United Kingdom ......... 65/DIG. 16

*Primary Examiner*—Kenneth M. Schor
*Assistant Examiner*—John J. Bruckner
*Attorney, Agent, or Firm*—Ware, Fressola, Van der Sluys & Adolphson

[57] ABSTRACT

An optical waveguide preform is fabricated by inserting a rod inside a tube and collapsing the tube. The inner diameter of the tube is adjusted before inserting the rod to provide a predetermined gap width between the inner surface of the tube and the outer surface of the rod. The gap width is selected as a function of the cross sectional area of the tube in order to minimize core eccentricity in the finished waveguide.

10 Claims, 1 Drawing Sheet

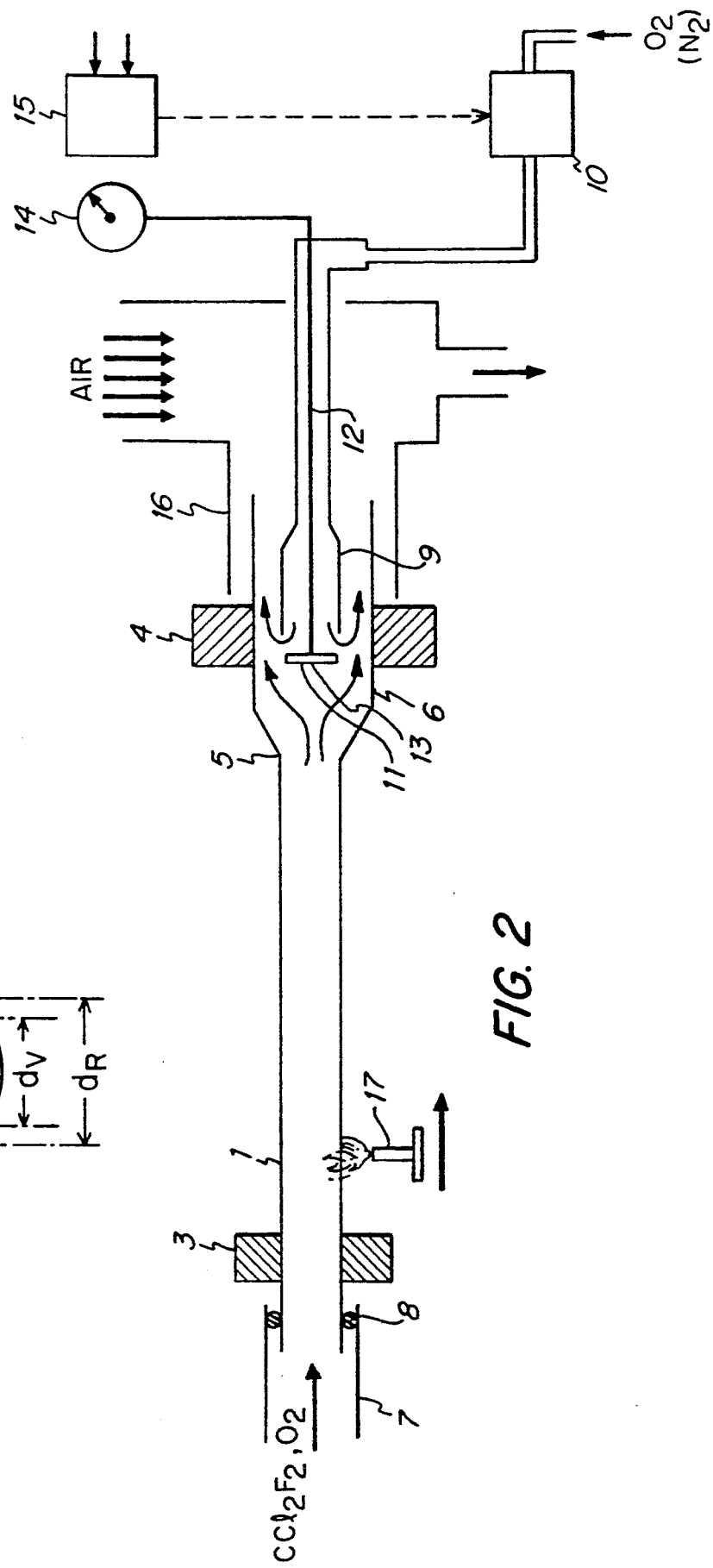

PROCESS FOR THE MANUFACTURING OF OPTICAL WAVEGUIDES WITH FUSION OF A SLEEVING TUBE ONTO A MOTHER PREFORM

CROSS-REFERENCE TO RELATED APPLICATIONS

This application is a Continuation-In-Part of U.S. patent application Ser. No. 07/546,240, filed June 28, 1990, now abandoned.

BACKGROUND OF THE INVENTION

1. Field of the Invention

The invention relates to a method of manufacturing an optical waveguide and, more particularly, to a method wherein a mother preform having a core and cladding is first formed as a rod, after which a sleeving tube is shrunk onto the mother preform and the composite preform is drawn into an optical waveguide.

2. Description of the Prior Art

Various processes of this type are known, e.g. from German Patent DE-A1 33 15 156. A problem in fusing a sleeving tube onto a mother preform consists in making sure that the core of the mother preform is located as exactly as possible in the center of the composite preform formed by fusion of the sleeving tube, i.e., that the core shows the minimum possible eccentricity with respect to the composite preform. This is because an excessively large core eccentricity in the composite preform is reproduced in the optical waveguide to be drawn from the composite preform and the waveguide will not meet the geometric requirements. The core eccentricity in optical waveguides must be small because, otherwise, an excessively high attenuation occurs at splice points and in optical waveguide connectors.

Heretofore, a mother preform was put into a sleeving tube, and the only requirement on the inner diameter of the sleeving tube was that the mother preform fit into the sleeve. In the case of a vacuum sleeving process, the gap between the mother preform and the sleeving tube causes the sleeving tube to fall down onto the preform slowly or quickly. However, a quick shrinking can cause the sleeving tube to fold, causing an unacceptable eccentricity.

SUMMARY OF THE INVENTION

An objective of the invention is to provide a solution to the problem described above.

This objective is achieved through the unique use of a method wherein after the fabrication of a mother preform, the outside diameter is measured. Depending on the measured outside diameter of the mother preform, a sleeving tube is expanded or shrunk, prior to inserting the mother preform, in such a way that its inside diameter is greater than the measured outside diameter of the mother preform by a predetermined amount of gap width. To expand or shrink the sleeving tube, it is rotated about its longitudinal axis in a glass lathe while a heat source is moved along its outside. A gas is passed through the tube from one side, and an auxiliary gas is blown into the tube from the other side. By controlling the flow rate of the auxiliary gas blown into the tube, a given pressure is adjusted in the tube which ensures that the desired expansion or shrinkage takes place. Preferably, the gas flowing through the tube comprises constituents which cause the inside surface of the tube of be cleaned and/or etched.

An apparatus for carrying out the method includes a glass lathe in which the sleeving tube, extended by an exhaust tube of greater diameter welded to its end, is rotated about its longitudinal axis. A heat source is movable along the outside of the sleeving tube for heating the tube. An inlet tube for introducing a gas into the sleeving tube is provided at one end, and an auxiliary gas injection tube projecting into the exhaust tube is provided at the other end and serves to introduce an auxiliary gas flowing in a direction opposite to that of the gas provided by the inlet tube. At an outlet end of the auxiliary gas injection tube, a baffle plate is mounted which reverses the direction of flow of the auxiliary gas emerging from the auxiliary gas injection tube, so that the auxiliary gas, mixed with the gas flowing through the sleeving tube, will flow through a space between the exhaust tube and the auxiliary gas injection tube and out of the exhaust tube. The baffle plate is mounted on a tubule passing through the auxiliary gas injection tube and serves as a pressure measurement means.

After the size of the sleeving tube is corrected, the mother preform is inserted and the sleeving tube is shrunk onto the mother preform to form a composite preform.

The sleeving tube treatment according to the invention leads to the surprising result that 97 percent of all optical waveguides manufactured by the process described show the excellent property of having a core eccentricity below 0.5 um.

BRIEF DESCRIPTION OF THE DRAWINGS

FIG. 1 is a sectional view showing a sleeving tube about a mother preform.

FIG. 2 is a schematic illustration of an arrangement for carrying out the tube treatment according to the invention.

DETAILED DESCRIPTION OF THE PREFERRED EMBODIMENT

In FIG. 1, the Cross-Sectional Area (CSA) of a sleeving tube 1 is shown as a circular ring marked by cross-hatching and the cross-sectional area of a mother preform 2 located in the sleeving tube 1 is shown as a circular surface marked by cross-hatching. Both parts are shown in the state in which the sleeving tube 1 has been pushed over the mother preform 2, but the fusion has not yet been started. It thus shows the starting arrangement for the fusion process. During the fusion process, both parts of are handled in such a way that the mother preform is located centrally in the sleeving tube. An annular gap, the unmarked circular ring located between the mother preform and the inner wall of the sleeving tube 1 in FIG. 1, separates the sleeving tube from the mother preform.

The principle of the invention contemplates pretreating the tube 1 in such a way, namely, letting it expand or shrink prior to inserting the preform, that the annular gap between the tube 1 and the mother preform 2 has a predetermined width, $\Delta$, after the preform is inserted. In other words: the outer diameter $d_v$ of the mother preform 2 is measured, then the inner diameter $d_R$ of the tube 1 is measured, and, if required, is changed by expansion or shrinkage of the tube in such a way that it is larger by a predetermined amount, $2\Delta$, than the measured outer diameter $d_v$ of the mother preform 2.

The setting of an optimal width of the annular gap, $\Delta$, is the solution of the problem of core eccentricity described in the Background of the Invention and is the basic idea of the invention. An explanation for this completely surprising finding that a specific gap width is the requirement for a low core eccentricity consists of the fact that, in the case of an excessively large or excessively small gap width, the tube shrinks irregularly onto the mother preform.

Which value of the gap width $\Delta$, as a function of the CSA of the available sleeving tube 1 is the optimal value, has been determined by a series of experiments, the results of which are found in Table I. For example, in the case of a mother preform having a diameter of about 17.5–18.0 mm, a sleeving tube having an outer diameter of about 25 mm and an inner diameter of about 19 mm, a predetermined amount of gap width of about 0.7 mm is the optimal gap width.

TABLE I

| CSA (mm$^2$) | Gap Width (mm) |
| --- | --- |
| 180 | 0.6 |
| 200 | 0.7 |
| 400 | 1.0 |
| 600 | 1.4 |
| 1000 | 1.5 |
| 1500 | 1.5 |
| 2000 | 1.5 |

From a review of Table I, it is apparent that the gap width does not vary linearly with CSA, but rather the gap width approaches asymptotically a constant value of approximately 1.5 mm. The gap widths of Table I were found to be applicable to a properly formed circular sleeving tube. In instances where the sleeving tub is deformed, such as being oval, a larger gap is desired, up to a constant gap of about 2.5 mm.

With reference to FIG. 2, it will now be explained in what manner the expansion or shrinkage of the sleeving tube 1, hereinafter referred to as 'tube' for simplification, is carried out. This is a process in which the tube is heated by a burner moved along its outside, so that, under the action of its surface tension, depending upon the difference between the pressure in the inner space of the tube and that in the external environment, the tube either expands or shrinks, i.e., its inner diameter either increases or becomes smaller. The pressure in the inner space of the tube 1 in this process is determined by the fact that a gas stream is conducted through the tube from one side, whereas an auxiliary gas is blown through the tube from the other side, and its flow quantity is controlled in such a way that the desired pressure is established in the tube.

The process of pressure control in a tube by means of a gas stream and a controllable auxiliary gas stream flowing in the opposite direction, for the process of internal coating of a tube and the process of collapse of an internally-coated tube into a glass rod is known in itself from German Patent DE-A1 29 07 731 or German Patent DE-A1 35 27 017.

Details of the new process and of an arrangement suitable for its execution will now be explained with reference to FIG. 2. The tube 1, which is to be allowed to expand or shrink to a specific extent, is clamped into a glass lathe known in itself, such as is conventionally used for the internal coating of glass tubes for the manufacture of optical waveguide preforms, and is rotated about its longitudinal axis in this lathe. One end of the tube itself is clamped into a left headstock 3 of the glass lathe and an exhaust gas tube 6 welded onto the other end of the tube 1 is clamped into a right headstock 4 of the glass lathe, with the diameter of said exhaust gas tube increasing to a distinctly larger diameter from the point 5 at which it is welded onto the tube 1, in the direction of the extension of the tube 1.

In the end of the tube 1 opposite to the exhaust gas tube 6, there is introduced a gas stream from a gas inlet tube 7, whose end is connected with the tube 1 rotating in the lathe by means of a rotation gasket 8. The gas stream may comprise gases such as $CCl_2F_2$ or other fluorinated hydrocarbons and $O_2$ which clean the inner wall of the tube when heat is applied. An auxiliary gas stream is introduced into the exhaust gas tube 6 in the opposite direction. This is done by means of an auxiliary gas tube 9 projecting into the open end of the exhaust gas tube 6. Oxygen or Nitrogen, for example, is used as an auxiliary gas and its flow quantity is regulated by means of a mass flow regulator 10. The auxiliary gas emerging from the front end of the auxiliary gas tube 9 there encounters the gas that has flowed through the tube 1 in the opposite direction and, together with this gas, flows out of the exhaust gas tube 6 through the space present between the auxiliary gas tube 9 and the exhaust gas tube 6. The auxiliary gas tube has a region with an expanded diameter at its open end. In this section of the space between the exhaust gas tube 6 and the auxiliary gas tube 9, the gas flowing through undergoes a pressure drop, so that the gas pressure at the exit end of the auxiliary gas tube 9 is greater than the air pressure surrounding the tube 1. This pressure difference is dependent upon the flow quantity, i.e., on the gas volume flowing through per unit of time, of the auxiliary gas.

In order that the auxiliary gas emerging from the front end of the auxiliary gas tube 9 does not flow directly opposite to the gas flowing through the tube 1 and interfere with its flow in the tube 1, a baffle plate 11 is located before the exit end of the auxiliary gas tube 9, producing a reversal of the direction of flow of the auxiliary gas stream. This baffle plate 11 is located on the front end of a tubule 12 used for pressure measurement. Tubule 12 is conducted through the auxiliary gas tube 9 and has a front end used as a pressure-measuring point 13 located in the center of the baffle plate 11. The tubule 12 is connected with an indicating device 14 for indication of the pressure and with a pressure control device 15. The desired pressure is introduced into this pressure control device 15 and the control device 15 then controls the mass flow regulator 10 in such a way that the measured pressure is identical to the desired pressure.

The exhaust gas tube 6 projects into a suction device 16, into which air is drawn from one side and from the other side of which the air is drawn off with the exhaust gases emerging from the exhaust gas tube. While a specific pressure is established in the tube 1 in the manner described, a burner 17 is moved parallel to the direction of flow of the gas, so that, in the region where the burner heats the tube to deformability, depending on the pressure prevailing in the tube, an expansion or shrinkage of the tube takes place. It can be easily determined by means of experiments what pressure must be used in order to achieve a specific expansion or shrinkage.

A favorable side effect of the tube pretreatment described above consists of the fact that the outer surface is flame-polished, i.e., that mechanical surface injuries melt and impurities of the outer surfaces are largely burned or evaporate. The same thing takes place with the inner surface, particularly if, as in the example, the gas introduced at the left end contains Oxygen.

At the same time, in the tube pretreatment described, the inner surface of the tube can also be subjected to an etching, which takes place in the gas phase, such as is known for the pretreatment of tubes for an internal coating from German Patent DE-C2 30 00 954 or, as an accompanying treatment in connection with the collapse of a tube, from German Patent DE-A1 30 31 160. For this purpose, one or more fluorine-containing compounds are mixed with the gas flowing through the tube.

What is claimed is:

1. A method of manufacturing optical waveguides, comprising the steps of:

fabricating a rod-shaped mother preform having a core and a cladding;

measuring the outside diameter of the mother preform;

obtaining a sleeving tube having an inside diameter and a cross sectional area, said sleeving tube to be shrunk onto the mother preform;

depending upon the measured outside diameter of the mother preform, expanding or shrinking said sleeving tube before said mother preform is inserted into said sleeving tube, so that the inside diameter of the sleeving tube is greater than the measured outside, diameter of the mother preform by a predetermined gap width amount, said predetermined gap width amount being selected as a function of said cross sectional area so as to minimize core eccentricity in said optical waveguides;

thereafter inserting the mother preform into the sleeving tube;

shrinking the sleeving tube onto the mother preform to form a composite preform; and drawing the composite preform thus obtained into the optical waveguide.

2. A method as described in claim 1, wherein the predetermined gap width amount is selected to minimize core eccentricity in said optical waveguide to less than 0.5 um.

3. A method as described in claim 1, wherein the predetermined gap width amount is controlled by the cross-sectional area of the sleeving tube.

4. A method as described in claim 1, wherein the predetermined gap width amount is equal to twice the width of an initial gap between the mother preform and the inside of the sleeving tube, and said gap width 15 in the range of 0.6 to 2.5 mm.

5. A method as described in claim 4, wherein the gap width is in the range of 0.6 to 1.5 mm when the sleeving tube is circular and the inner and outer surfaces of the sleeving tube are concentric.

6. A method as described in claim 4, wherein the gap width becomes constant after the cross-sectional area of the sleeving tube reaches approximately 1000 mm$^2$.

7. A method as described in claim 4, wherein gap widths up to 2.5 mm are used when the sleeving tube is not circular and the inner and outer surfaces are not concentric.

8. A method as described in claim 1, wherein the step of expanding or shrinking a sleeving tube comprises the steps of:

rotating the sleeving tube about its longitudinal axis in a glass lathe;

moving a heat source along the tube's outside surface;

passing a gas through the tube from one side; and blowing an auxiliary gas into the tube from the other side.

9. A method as claimed in claim 8, additionally including the step of controlling the flow rate of the auxiliary gas blown into the tube, so that a given pressure is adjusted in the tube which ensures that the desired expansion or shrinkage takes place.

10. A method as claimed in claim 8, wherein the gas flowing through the tube comprises constituents which cause the inside surface of the tube to be cleaned and/or etched.

* * * * *

UNITED STATES PATENT AND TRADEMARK OFFICE
CERTIFICATE OF CORRECTION

PATENT NO. : 5,127,929
DATED : July 7, 1992
INVENTOR(S) : R. Günther; U. Siemers, M. Wittmann It is certified that error appears in the above-identified patent and that said Letters Patent is hereby corrected as shown below:

Title page, item [54] and column 1, line 2, "Manufacturing" should be --Manufacture--;

Column 5, line 25, "outside, diameter" should be -- outside diameter--; and

Column 6, line 9, "15" should be --is--.

Signed and Sealed this

Thirty-first Day of August, 1993

Attest:

BRUCE LEHMAN

Attesting Officer  Commissioner of Patents and Trademarks